(12) United States Patent
Crasser

(10) Patent No.: US 7,441,689 B2
(45) Date of Patent: Oct. 28, 2008

(54) ORBITAL FRICTION WELDING METHOD AND DEVICE FOR CARRYING OUT SAID METHOD

(75) Inventor: Leonhard Crasser, Naila (DE)

(73) Assignee: Multi Orbital Systems GmbH, Naila (GB)

( * ) Notice: Subject to any disclaimer, the term of this patent is extended or adjusted under 35 U.S.C. 154(b) by 442 days.

(21) Appl. No.: 11/339,249

(22) Filed: Jan. 24, 2006

(65) Prior Publication Data

US 2006/0157538 A1 Jul. 20, 2006

Related U.S. Application Data

(63) Continuation-in-part of application No. PCT/EP2004/008049, filed on Jul. 19, 2004.

(30) Foreign Application Priority Data

Jul. 24, 2003 (DE) .................. 103 33 783

(51) Int. Cl.
*B23K 20/12* (2006.01)
*B23K 31/02* (2006.01)

(52) U.S. Cl. .............. 228/110.1; 228/1.1; 228/112.1; 228/2.1; 228/113; 228/114.5

(58) Field of Classification Search .............. 228/110.1, 228/114.5, 113, 1.1, 2.1
See application file for complete search history.

(56) References Cited

U.S. PATENT DOCUMENTS 3,088,343 A 5/1963 Kuris et al.
3,702,674 A * 11/1972 Bodine .................. 228/1.1
5,378,951 A * 1/1995 Snyder .................. 310/17
5,697,545 A * 12/1997 Jennings et al. .......... 228/112.1
6,091,215 A 7/2000 Lovett et al.
2002/0070259 A1 6/2002 Crasser

FOREIGN PATENT DOCUMENTS

DE 199 38 100 A 2/2001
EP 0 504 494 A 9/1992
EP 0 707 919 A 4/1996

OTHER PUBLICATIONS

International Search Report, dated Dec. 3, 2004, regarding PCT application No. PCT/EP2004/008049.

* cited by examiner

*Primary Examiner*—Jerry Lorengo
*Assistant Examiner*—Erin P Barry
(74) *Attorney, Agent, or Firm*—Graybeal Jackson Haley LLP

(57) ABSTRACT

The invention relates to an orbital friction welding method and a friction welding device for welding workpieces by means of friction welding units, wherein the workpieces are pressed against each other in the contact plane during the application of the oscillation energy. To this effect, n>1 friction welding heads are mounted, in a stationary manner, at least on one side of the contact plane in an orbital plane, in the area of the workpieces so that the n>1 friction welding heads, respectively facing one side, are oscillated with the same friction frequency, the same amplitude and the same preset phase position.

21 Claims, 11 Drawing Sheets

0/360° phase difference, equal running rotation direction

0/360° phase difference zero relative movement

45/315° phase difference, equal running rotation direction uniform circular relative movement 90/270° phase difference, equal running rotation direction 0° phase 90° phase difference 270° phase difference 90° phase difference 270° phase difference uniform circular relative movement 135/225° phase difference, equal running rotation direction uniform circular relative movement 180° phase difference, equal running rotation direction uniform circular relative movement, maximum amplitude 0/360° phase difference, counter running rotation direction linear relative movement 45/315° start phase difference, counter running rotation direction
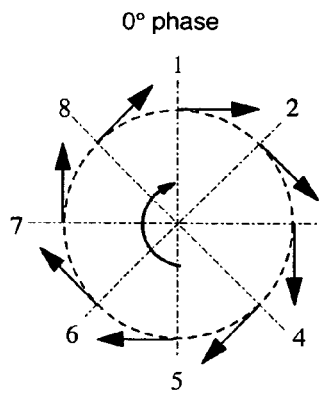
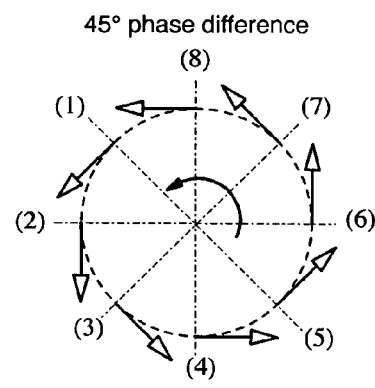
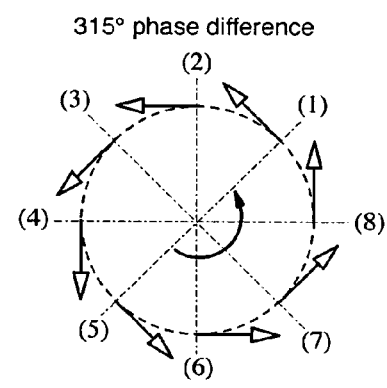
Fig. 9A  Fig. 9B  Fig. 9C
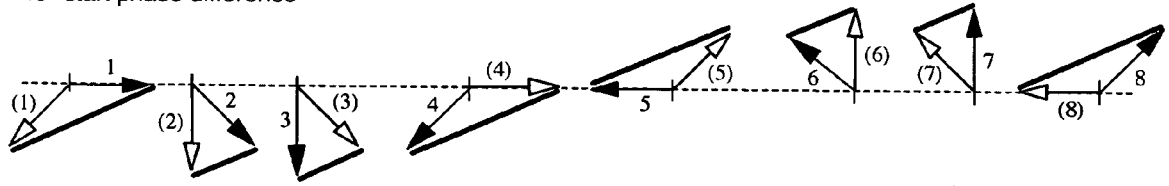
Fig. 9D
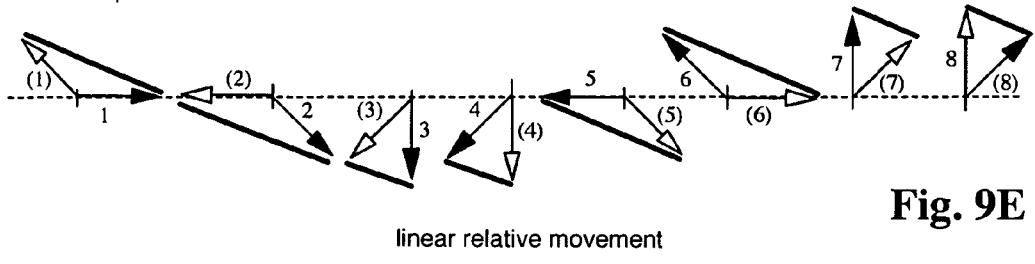
linear relative movement
Fig. 9E 90/270° start phase difference, counter running rotation direction 0° phase 90° phase difference 270° phase difference 90° start phase difference 270° start phase difference linear relative movement 135/225° start phase difference, counter running rotation direction 0° phase 135° phase difference 225° phase difference 135° start phase difference 225° start phase difference linear relative movement 180° start phase difference, counter running rotation direction 0° phase 180° phase difference 180° start phase difference linear relative movement

ORBITAL FRICTION WELDING METHOD AND DEVICE FOR CARRYING OUT SAID METHOD

CROSS-REFERENCE TO PRIORITY APPLICATION

This is a continuation-in-part application that claims benefit, under 35 USC §120, of co-pending International Application PCT/EP2004/008049, filed on 19 Jul. 2004, designating the United States, which claims foreign priority under 35 USC §119 (a) to German Patent Application No. 103 33 783.0 filed 24 Jul. 2003, which applications are incorporated herein by reference.

BACKGROUND OF THE INVENTION

The invention relates to a method for orbital friction welding for the welding of workpieces, whereby the workpieces are continually pressed against one another in an axial direction, during a supply of vibratory energy into a joining plane. Further the invention relates to a device for carrying out said method, wherein a circular movement energy for the welding of the workpieces, which are under axial pressure and having an optional cross-section within the said joining plane (F), can be introduced into the said joining plane.

Friction welding methods, as such, are already known, whereby, due to relative movement and simultaneous pressure, friction is engendered in order to attain the necessary melting energy at the surfaces to be welded.

DE 199 38 100 A discloses a multihead friction method for the manufacture of window framings and door encasements built of profile members. To accomplish simultaneous welding, the individual profile members of a framing are rigidly clamped within laterally placed friction welding heads on both sides of the joining plane and proximal thereto, and with the aid of said heads, the said members are set into vibration, whereby the joining surfaces are simultaneously pressed together. Such a use of the friction welding heads enables a considerable reduction of the process-time, however, in this way, only relatively short rods, which angularly confront one another can be welded, whereby the axis of friction does not lie in the centroid of the surface.

SUMMARY OF THE INVENTION

On this account, an object of the invention is to find means to weld relatively large and lengthy workpieces, whereby even large quantities of energy shall be introducible in a simple manner into the joining plane, in order to bring large quantities of material therewithin up to a temperature capable of sustaining welding.

According to the invention, this purpose is achieved, in the case of the orbital friction welding method mentioned in the introductory passages, in that at least on one side of the joining plane (F) more than one (n>1) friction welding heads on at least one friction disk are so located in an orbital plane in the area of the workpiece, that the vibration heads within the said friction welding heads are mounted stationary to the friction disk, and that the at least one (n>1) friction welding heads, which are proximal to one side, respectively, are set in vibration at an equal friction frequency and an equal amplitude as well as a an equal predetermined phase position.

For such a method, provision is additionally made that the thrust, i.e. the axial joining pressure, of the said more than one (n>1) friction welding heads required for the energy feed, is executed by means of more than one (n>1) thrust axes, so that an imaginary (hereinafter, "virtual") combined thrust axis, which is formed by the superimposition of said plurality of thrust axes, when using force-controlled infeed, runs through the centroid of the joining plane.

In order that the kinematical conditions can be optimized, provision is made, that the n>1 friction welding heads be so located that the frictional axes in sum with their virtual combined frictional axes run through the combined mass centroid of all vibrating masses, which include at least eccentric shaft and friction plate of the frictional welding heads, friction disks, workpiece holder and workpiece.

For the purpose of increasing the quantity of the vibratory energy which can be applied, the method provides further that the vibratory heads of the n>1 friction welding heads are rigidly mounted on both sides of the joining plane (F) in a plurality of orbit planes on the friction disks, respectively, and that the n>1 friction welding heads on the one side of the joining plane (F) are set into vibration by a preset phase position with reference to the n>1 friction welding heads on the other side of the joining plane.

In order to produce the pressure, which is to be introduced into the joining plane during the feeding of the vibratory energy, material feed mechanisms axially direct the workpieces together at the joining plane under a distance-time control, whereby, ideally, the virtual combined axis runs through the joining surface centroid in the joining plane of the workpieces. From this arises the advantage that joining surfaces, which are not abutting coplanar against one another, are worn off until flatness, thus resulting in a holohedral welding.

For an orbital friction welding device enabling the carrying out of the method, wherein a circular movement energy can be introduced into the joining plane for the welding of the workpieces, which are subjected to axial pressure and having an optional cross-section at the joining plane (F), provision is made in accord with the invention that the vibratory heads of the n>1 friction welding heads are stationary mounted to the at least one friction disk in at least one orbital plane around the workpieces to be welded in such a manner that the virtual combined orbital frictional axis resulting from the superimposition of the n>1 frictional axes of the individual friction welding heads runs through the area of the mass centroid (22) and that the n>1 friction welding heads vibrate with an equal frictional frequency and an equal amplitude as well as a predetermined phase position.

The arrangement of a plurality of friction welding heads in an orbital plane around the workpieces to be welded yields an advantage that, by the increase of the number of the friction welding heads, arbitrarily high quantities of energy can be applied, so that welding of workpieces such as, for example, long, heavy-walled tubes, extended structural bar members or workpieces having excessive width is possible with only little expenditure of time.

In order to assure that all areas of the joining surface are supplied with the same amount of energy, the invention provides that, when using force control, all thrust axes possess, for the creation of surface symmetry in regard to the centroid of the joining surface, the same distance from the joining surface centroid in the joining plane and, simultaneously, are angularly symmetrical arranged. Further, the mathematical product of the said distance of the individual thrust axes from the joining surface centroid multiplied by the respective axial pressure force (P) is constant at the combined orbital axis for all friction welding heads.

In the case of workpieces, which in cross-section exhibit no symmetrical construction, or if such a design is necessary, provision is made in accord with the invention that all thrust axes possess different distances from the centroid of the joining surface, that the applied pressure force (P) of the respective thrust axes, with consideration given to the angular positioning of the thrust axes to one another, is inversely proportional to its distance from the said joining surface centroid, and that the mathematical product of the distance of the individual thrust axes from the joining surface centroid multiplied by the respective axial pressure force (P) in the combined orbital frictional axis is constant for all thrust axes.

In further regard to all these friction welding procedures, provision is made in that on both sides of the joining plane (F), respectively, a plurality of friction welding heads, including their vibrating heads, are stationary mounted to a friction disk, which is affixed in an orbital plane encompassing the workpieces to be welded, and in that all the friction welding heads placed on the same friction disk vibrate with the same frequency, the same amplitude and the same phase position.

One embodiment of the invention provides that one workpiece selected from two workpieces to be welded end to end, is made motionless, i.e. is "fixed", and that n>1 friction welding heads are solely placed in an orbital plane around the other workpiece to set this second workpiece into frictional vibration.

This embodiment of the present invention is of advantage for workpieces exhibiting smaller quantities of material, or for workpieces made of materials, which are relatively easy to be welded such as, for instance, thin walled plastic tubing.

Considering placement of friction welding heads in orbital planes on both sides of the joining plane, a linear thrust vector is produced by the circular placement of n>1 friction welding heads on both sides of the joining plane (F) of the workpieces, which are to be welded together end to end, whereby the n>1 friction welding heads placed on both sides of the joining plane vibrate with an equal running phase or a counter running rotation with a continuously changing phase difference, and are opposite to one another, and having a predetermined starting phase. (linear relative movement)

A circling thrust vector within the joining plane results, if the n>1 friction welding heads located on one side of the joining plane, with respect to those n>1 friction welding heads placed on the other side of the joining plane vibrate with a counter running phase or with the same direction of rotation and a predetermined phase difference. (circling relative movement)

An adjustment of the quantity of energy fed into the joining plane can be effected by means of an adjustment of the phase difference between the friction welding heads of one orbital plane and the friction welding heads of the orbital plane on the other side of the joining plane, wherein a phase difference of 180° brings about a maximum relative movement in the joining plane, that is to say, results in frictional vibration of maximum amplitude.

The invention further enables the welding of, for instance, a structural bar, which stands in T-shape on a transverse beam, wherein the vibration heads of the n>1 friction welding heads are stationary affixed to the said transverse beam in an axial plane orthogonally aligned to the longitudinal axis of the said structural bar and, moreover, the n>1 friction welding heads are fixed in an orbital plane about the said structural bar.

In this arrangement, care is to be taken, in that the virtual combined orbital frictional axis, which results from the superimposition of the vibrations of the plurality (n) of vibratory axes of the individual friction welding heads, runs through the area of the mass centroid, and in that the friction welding heads on both sides of the joining plane vibrate with the same friction frequency, wherein a predetermined phase difference is maintained between the friction welding heads on one side of the joining plane and the friction welding heads arranged on the other side of the joining plane.

For the welding of, for example, pipeline equipment, such as pipe sections which could carry gas, oil or water, and which may be made of plastic, metal or composite materials, it is advantageous for the plurality (n) of friction welding heads to be provided in an orbital arrangement, respectively, capable of being firmly fastened about the pipe sections and movable by a vehicle. Obviously, it is also possible in such a case to have an arrangement, in which the pipe sections to be welded can be moved through stationary orbitally arranged friction welding heads into the respective welding position and be held in that position during the course of the welding.

In the case of such an arrangement, for the distance/time controlled moving of the pipe sections into the action position of the pressure for welding in the joining plane, advantageously, thrust units with hydraulic or pneumatic drives or with mechanical and/or electro-mechanical powered drives, respectively, can be provided, which engage either with the workpieces or with the friction disks, which, are firmly affixed to the workpieces.

BRIEF DESCRIPTION OF THE DRAWINGS

The advantages and features of the invention are examined in greater detail with the aid of the following description of embodiment examples in combination with the claims and the drawings. The figures show:

FIG. 9A to FIG. 9C a top view onto vibration heads, situated opposing one another, at a start phase difference of 45° or 315°, respectively, and with a counter running direction of rotation;

FIG. 9D and FIG. 9E a presentation of the linear relative movement for a phase difference of 45° in accord with FIG. 9B and a phase difference of 315° in accord with FIG. 9C;

DETAILED DESCRIPTION OF THE DRAWINGS

Figure 1:
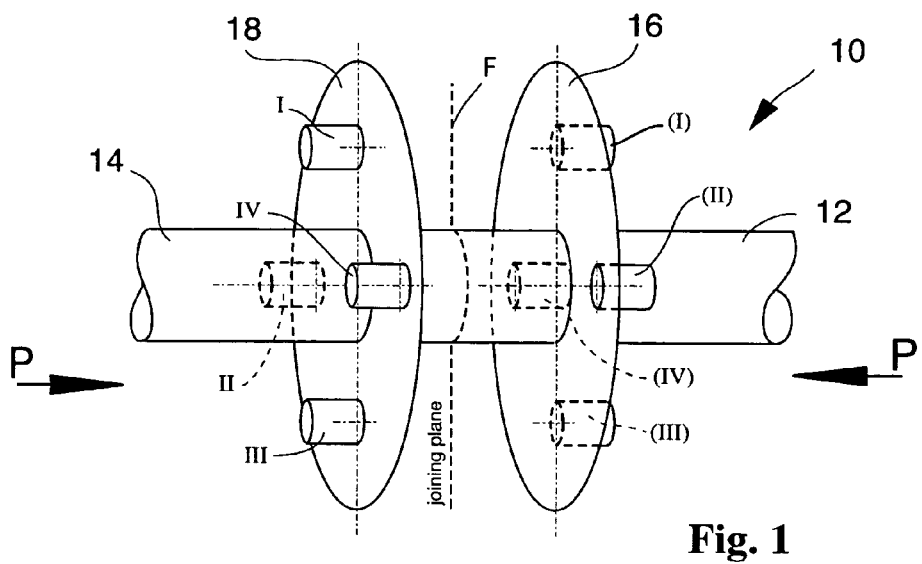
FIG. 1 a schematic presentation of an orbital friction welding device for the welding of two pipe sections along a joining plane.

In FIG. 1 is schematically presented an orbital friction welding device 10 for the welding of two extended pipe sections 12 and 14, which sections are being pressed together, end to end in a joining plane F, by an axial force P. On the two pipe sections 12 and 14, orbital disks 16 and 18 are stationary affixed. In this arrangement, it is of advantage, if the virtual combined thrust axis and the virtual combined friction axis are aligned with one another and the joining plane centroid location coincides with the mass centroid location. Obviously, application cases can be provided, wherein the two centroids are offset from one another, that is to say, the thrust axes are not unconditionally required to be aligned with the friction axes.

These orbital disks 16 and 18 serve for the mounting of friction welding heads I, II, III, IV or I', II', III', IV' or I", II", III", IV", respectively. These friction welding heads are fastened to the orbital disk with their respective vibration head. Thereby, they are held stationary by means of connections (not shown).

Friction welding heads, which are useable and appropriate in order to carry out the invention, are known by DE 4 436 857 A. The use of these friction welding heads offers the advantage that a plurality of friction welding heads can be easily synchronized and especially they permit a faultless starting synchronization, so that the frictional welding procedure begins with the desired phase and the phase position between the oppositely disposed friction welding heads can be retained with considerable assurance. This known friction welding head is equipped with a control eccentric and a parallel guide, by means of which a drive side rotation energy can be converted into a circular, parallely guided movement energy. For startup synchronization, all eccentrics of the individual friction welding heads are brought to full starting amplitude and then the friction welding heads, which lie opposed to one another are adjusted to the desired start-phase position. Only following this adjusting of the phase displacement between the friction welding heads, which are mounted on oppositely situated orbital disks, are the orbital disks 16 and 18 clamped to the pipe sections 12 and 14, and subsequently brought into operation for the welding of said sections in the joining plane.

Figure 2:
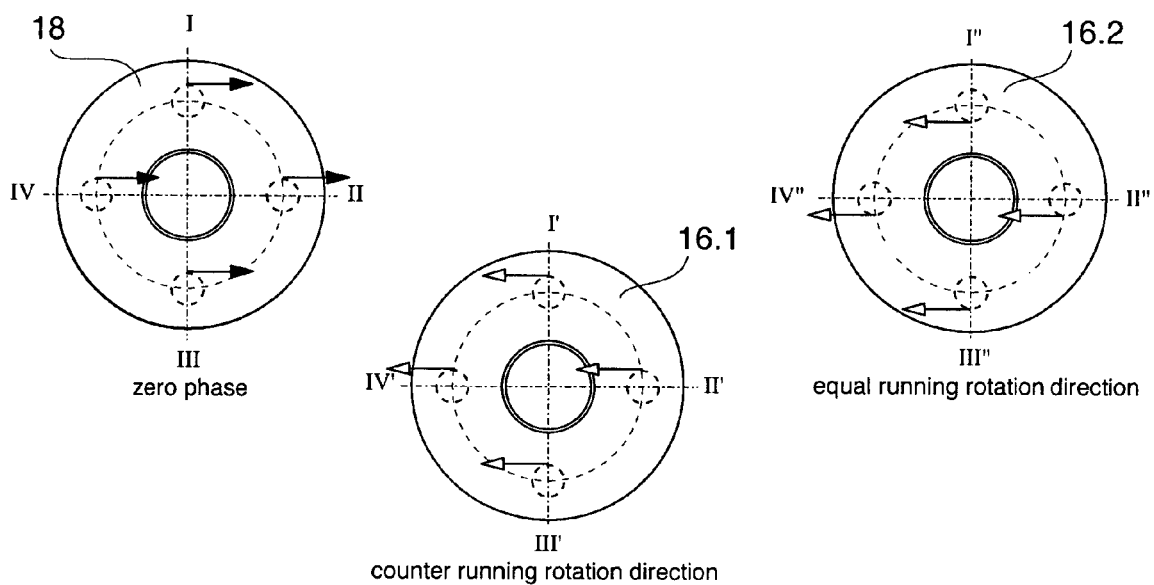
FIG. 2 a schematic view onto the orbital planes showing the friction welding heads, in an axial view looking upon a joining plane from one side, wherein, on one hand, the left side view onto the orbital plane shows the vibrating friction welding heads in a zero phase-position, and, on the other hand, the middle view onto the friction welding heads serves to explain an equal running phase or a counter running rotation direction, respectively, and the right view onto the friction welding heads serves to explain a counter running phase or an equal running rotation direction, respectively.

Orbital disks 16 and 18 are depicted in FIG. 2, to aid in the explanation of the relative movement of the vibration heads of the oppositely placed friction welding heads, wherein the presentation of the orbital disk 16.1 is made for the clarification of the equal running phase or the counter direction of rotation, respectively, and the drawing of the orbital disk 16.2, provides an explanation of the counter running phase or the equal running direction of rotation, respectively. For illustrating purposes, the kinematic conditions in the joining plane are pictured therein in an axial view from one side.

For these explanations, only the respective friction welding heads I and I' or II", respectively, will be looked at in the following discussion. In regard to the desired function, it is obviously recognizable that respectively also the other involved friction welding heads II, III, IV as well as II', III', IV' and II", III", IV" are operated at correspondingly the same frequency, amplitude and phase so that the desired relative movement of the orbital disks, which lie opposite to one another, and therewith of the pipe sections in joining plane F, is established.

As the welding procedure continues, an axial pressure is exerted on the pipe sections, which are to be welded, this being done with the aid of thrust units. The said pressure may be introduced through the pipe sections themselves as well as through the orbital disks, which are stationary affixed to the said pipe sections. These thrust units can comprise hydraulic or pneumatic drives as well as mechanical and/or electromechanical drives, respectively.

Since the surface centroid in the joining plane finds itself in the center of the pipes for both pipe sections, the individual friction welding heads are placed at an angularly symmetrical position about the surface centroid and at an equal separating distance from the surface centroid, whereby by means of all friction welding heads the same movement energy is introduced into orbital disks and, thereby, also in each point of the joining surface, i.e. in the welding seam. Corresponding to the material, which is used for the pipes, as well as the thickness of the pipe wall and in accord therewith the quantity of material, more or less energy becomes necessary for the welding process. For meeting the requirements of specific applications, it is provided that, deviating from the depicted four friction welding heads mounted on one orbital disk, fewer, that is, for example, three, or more friction welding heads could possibly be used, in order that welding energy proportional to the task at hand may be available.

Although, on the basis of economics, it is advantageous, to use friction welding heads of the same type, each of which, accordingly, can provide the same welding energy, it is also possible to install on an orbital disk, differing types of welding heads, wherein care is to be taken only that, on one hand, the angular symmetry to the centroid of the surface is maintained constant, and on the other hand, so is the mathematical product of the distance of the friction axes from the joining plane centroid multiplied by the respectively introduced vibration energy at continuously constant axial pressure on the pipes to be welded.

In the following, explanations are presented for the resulting relative movements, that is to say, the resulting thrust vectors between the two orbital disks 16 and 18 for different same/counter running rotational directions and also the effective phase differences between the two orbital disks. Since, however, with the same phase difference, all friction welding heads on one orbital disk impose the same relationships, in the following, principally and respectively, the vibration behavior of the vibration heads for the two friction welding heads I and (I) are explained.

Figure 3A:
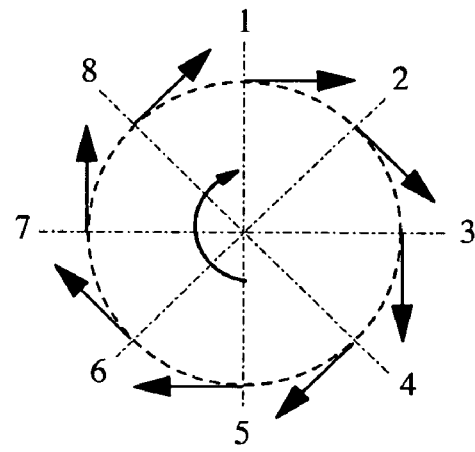
FIG. 3A and FIG. 3B a top view onto the vibration of two friction welding heads, situated opposing one another in the joining plane, and which vibrate at a phase difference of 0° or 360°, respectively, with an equal running direction of rotation.
Figure 3B:
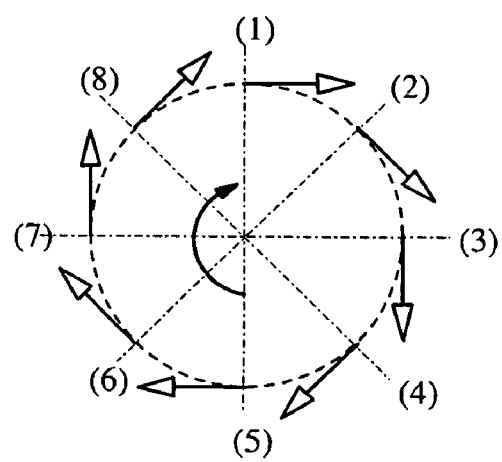

In the FIGS. 3A and 3B the relationships for the vibration heads of the friction welding heads I and (I) are presented, whereby the arrow heads for the movement vectors for the zero phase at all points of time, namely, 1, 2, 3, 4, 5, 6, 7, 8 are solid (bold), and the movement vectors for the same running phase, that is, the counter running direction of rotation at all points of time, namely, (1), (2), (3), (4), (5), (6), (7), (8), correspondingly, have open arrow heads. The same is valid also for the following explanatory depictions of phase displacements.

Figure 3C:
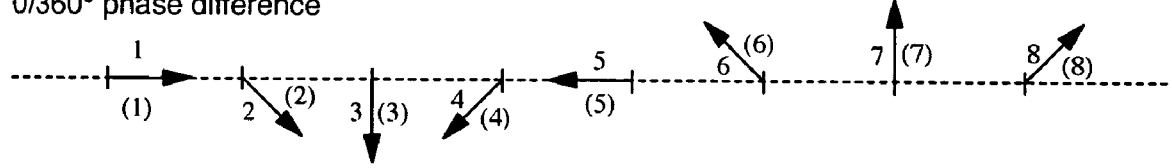
FIG. 3C a presentation from which may be inferred, that a 0°/360° phase difference leads to no relative movement of the vibration heads.

In the FIGS. 3A and 3B is shown the phase difference 0° or the phase difference 360°, respectively, at the same running direction of rotation. By means of the superimposition of the movement vectors of the same size at the different points of time 1 to 8 or (1) to (8), respectively, in the respective same size and direction, no relative movement is engendered for the vibration heads of the friction welding heads, which lie opposite to one another on the orbital disks 16 and 18. This is seen again in the presentation offered by FIG. 3C, wherein the movement vectors for all the presented points of time coincide with one another, which indicates that no relative movement results.

Figure 4A:
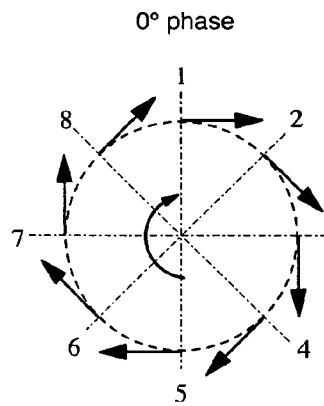
FIG. 4A to FIG. 4C a top view onto vibration heads, situated opposing one another, at a phase difference of 45°/315° and with an equal running direction of rotation.
Figure 4B:
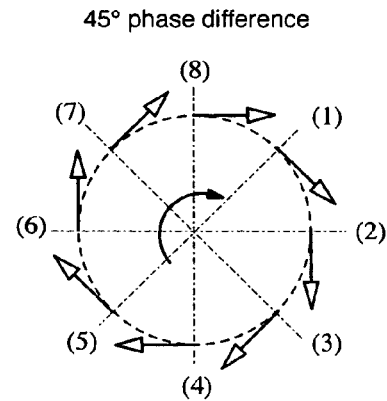
Figure 4C:
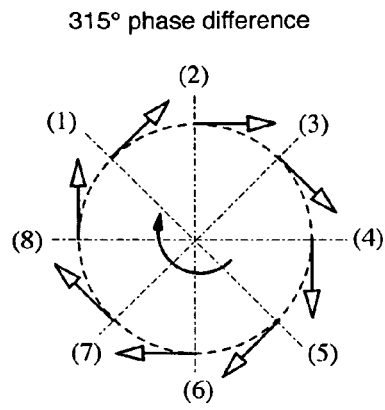
Figure 4D:
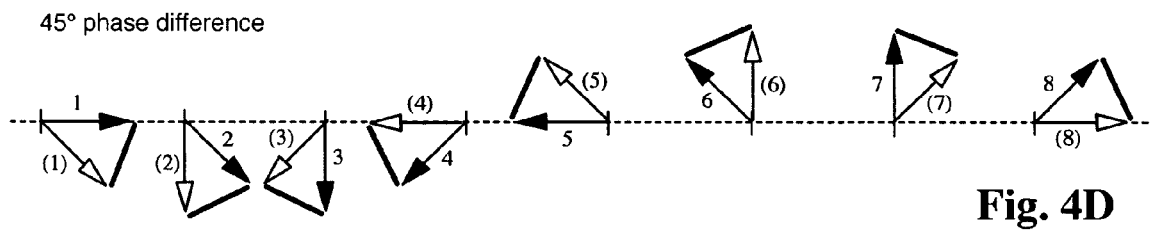
FIG. 4D and FIG. 4E a presentation of the uniform, circular relative movement for the phase difference of 45° in accord with FIG. 4B and 315° in accord with FIG. 4C.

Now considering FIGS. 4A and 4B, a uniform, circular relative movement results from a phase difference of 45° by drawing the vectors for the individual observed points of time in accord with FIG. 4D. From the presentation can be inferred that between the vibration heads of the friction welding heads I and (I) a relative movement results, which is characterized in FIG. 4D by means of the bold connection line between the arrowheads of the two movement vectors.

Figure 4E:
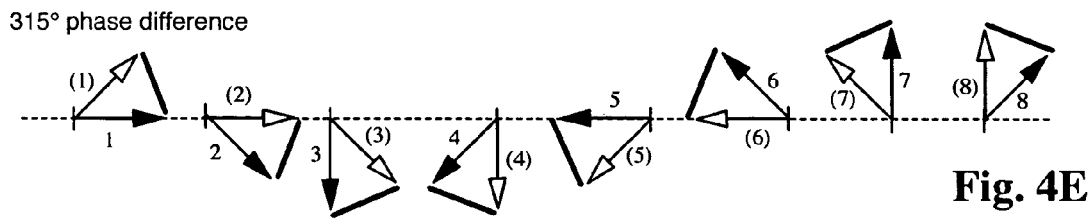

The same is also valid for the phase difference of 315° as may be seen from the comparison of the movement vectors of FIG. 4A and FIG. 4C in accord with the presentation in FIG. 4E. In both cases results a uniform, circular relative movement or a uniformly circulating thrust-vector, respectively.

Figure 5A:
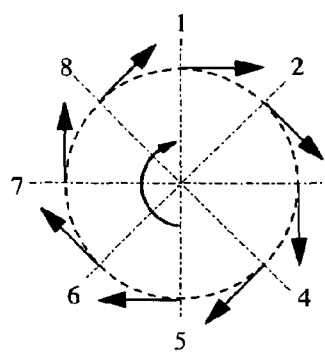
FIG. 5A to FIG. 5C a top view onto vibration heads, situated opposing one another, at a phase difference of 90° or 270°, respectively, and with an equal running direction of rotation.
Figure 5B:
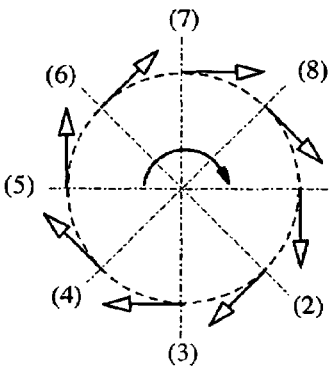
Figure 5C:
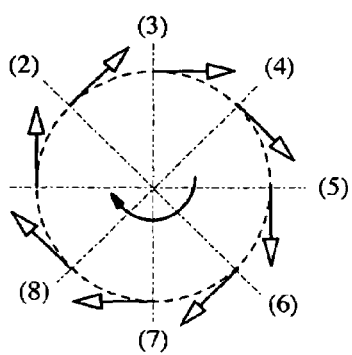
Figure 5D:
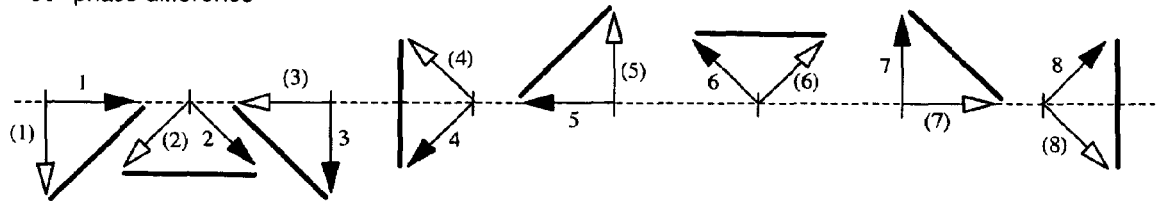
FIG. 5D and FIG. 5E a presentation of the resulting uniform, circular relative movement for a phase difference of 90° in accord with FIG. 5B and a phase difference of 270° in accord with FIG. 5C.
Figure 5E:
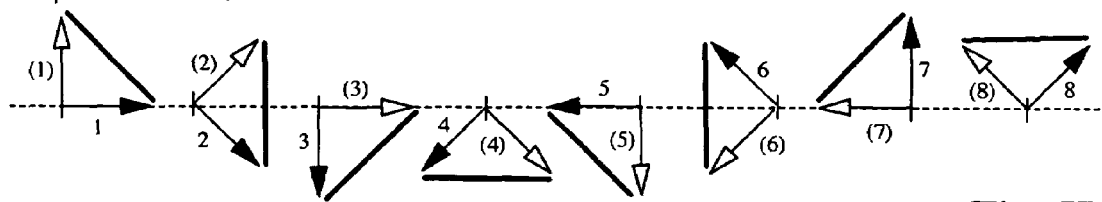

Corresponding observations can be made in relation to FIG. 5A and FIG. 5B as well as 5A and FIG. 5C for a phase difference of 90° and 270°, respectively, at equal running directions of rotation. The corresponding superimposition of the movement vectors is depicted in FIG. 5D for the 90° phase difference and in FIG. 5E for the 270° phase difference. From these illustrative demonstrations one can infer, that a larger relative movement results at the 90° phase difference and the 270° phase difference than is the case at the 45° phase difference and the 315° phase difference.

Figure 6A:
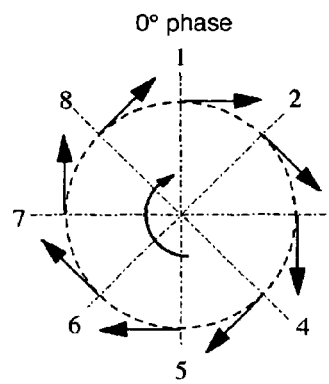
FIG. 6A to FIG. 6C a top view onto vibration heads, situated opposing one another, at a phase difference of 135° and 225° and with an equal running direction of rotation.
Figure 6B:
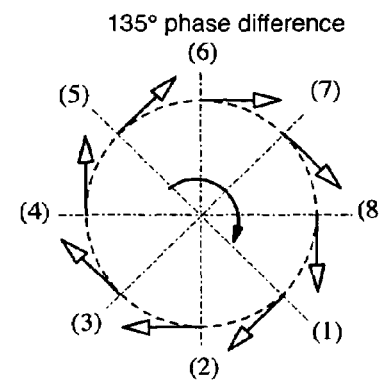
Figure 6C:
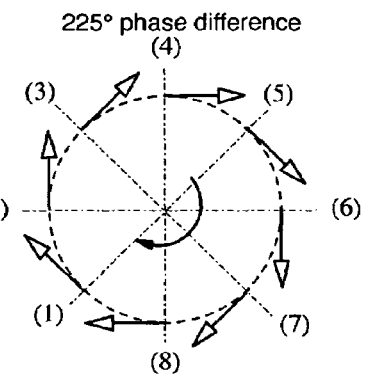
Figure 6D:
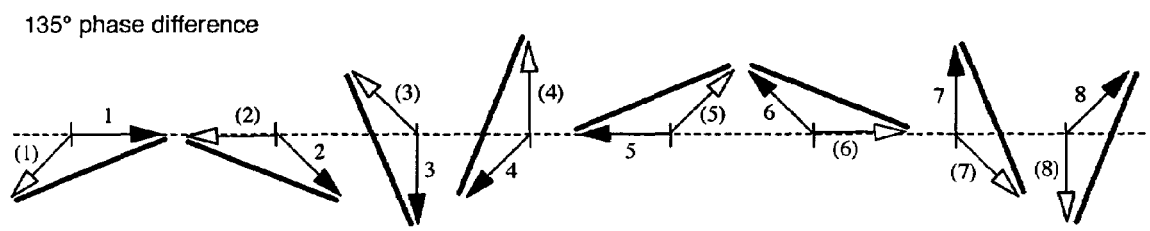
FIG. 6D and FIG. 6E a presentation of the uniform, circular relative movement for a phase difference of 135° in accord with FIG. 6B and a phase difference of 225° in accord with FIG. 6C.
Figure 6E:
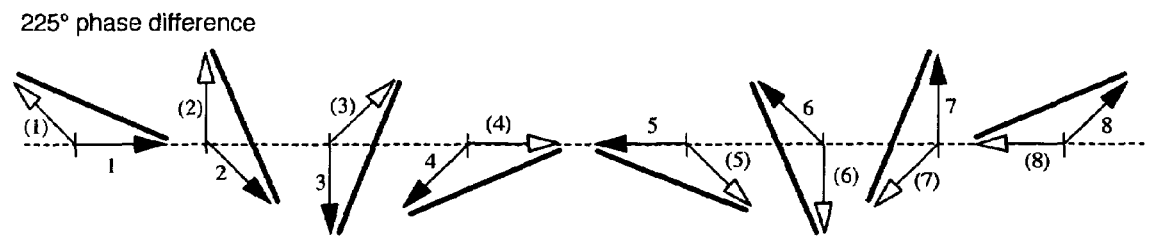

Correspondingly, the same is valid for the phase difference 135° or 225°, respectively, at an equal running direction of rotation, which arises from the superimposition of the movement vectors in accord with FIG. 6A and FIG. 6B, as well as FIG. 6A and FIG. 6C. The relative movement resulting from the superimposition of the movement vectors, as shown in the FIGS. 6D and 6E, is likewise a uniform, circular relative movement, however, in comparison with the previously examined cases, this has a greater amplitude.

Figure 7A:
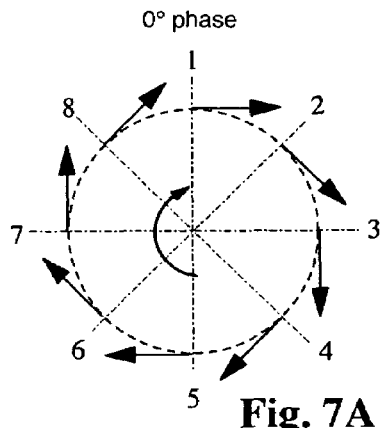
FIG. 7A and FIG. 7B a top view onto vibration heads, situated opposing one another, at a phase difference of 180° and with an equal running direction of rotation.
Figure 7B:
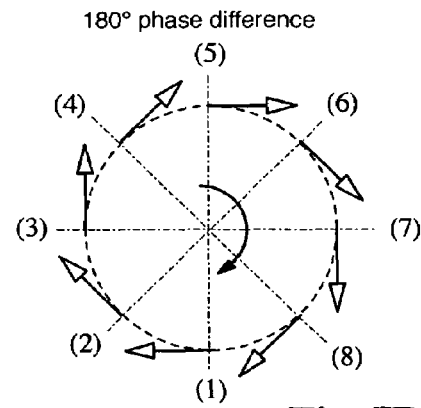
Figure 7C:
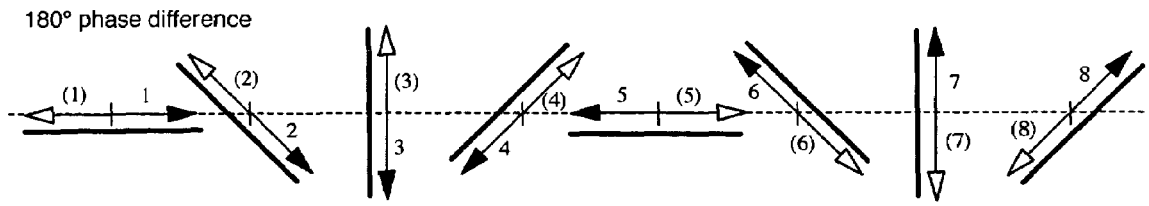
FIG. 7C a presentation of the resulting uniform and circular relative movement for the phase difference of 180° in accord with FIG. 7B.

For the observation of the phase difference of 180°, there results at an equal running direction of rotation, from the superimposition of the movement vectors for the individual given points of time, a maximum amplitude of the uniform, circular relative movement as can be taken from FIG. 7C.

For all previously examined cases of the various phase differences, one understands that the relative movement, which results from of the superimposition of the movement vectors of the individual friction welding heads on opposingly placed orbital disks, is always a uniform, circular relative movement, which merely changes its amplitude and its circular movement with reference to the observed points of time 1 to 8, or (1) to (8), respectively.

From this concept arises the possibility that both the linear direction, i.e. the friction direction, depending upon the phase position as well as the energy introduction depending upon the phase position can be changed at once by an adjustment of the phase position.

In the following observations, the superimpositions of the movement vectors for different points of time 1 to 8 and (1) to (8) are looked at, having of a counter running direction of rotation.

Figure 8A:
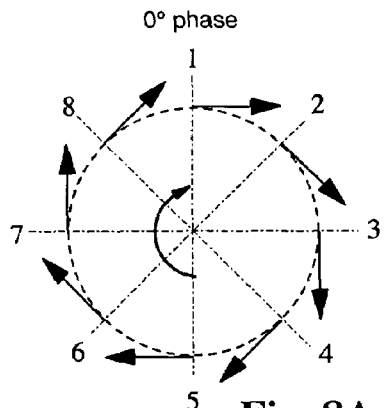
FIG. 8A and FIG. 8B a top view onto vibration heads, situated opposing one another, at a phase difference of 0° or 360°, respectively, and with a counter running direction of rotation.
Figure 8B:
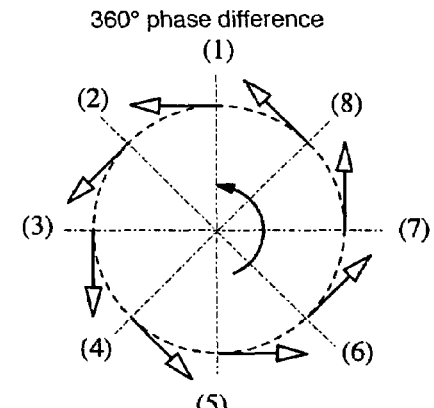
Figure 8C:
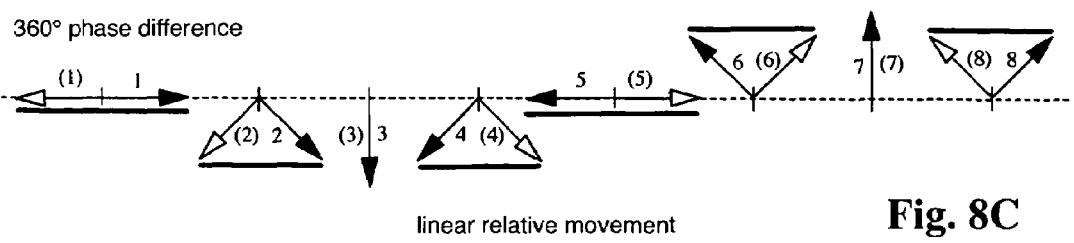
FIG. 8C a presentation of the resulting linear relative movement for the phase difference of 360° in accord with FIG. 8B.

In FIGS. 8A and 8B are shown the conditions of counter running rotational direction at a phase difference of 0° and a phase difference of 360°. By the superimposition of the movement vectors at the time points that are designated by the same Arabic numbers, the relative movements as can be seen in FIG. 8C for a 0° and a 360° phase difference result, whereby it becomes evident, that a linear relative movement is generated with the exception of the time points 3 and 7, in which the relative movement is zero.

In FIG. 9A to FIG. 9C are shown the conditions for a counter running rotational direction and a startup phase difference of 45° and 315° with a constantly changing phase difference. By means of superimposition of the movement vectors in accord with the FIGS. 9A and 9B, the 45° starting phase difference results in a linear relative movement of the amplitude for the points of time 2, 3, 6 and 7, which is smaller than the amplitude for the points of time 1, 4, 5 and 8. Thereby, the amplitude, at a phase difference of 45° at 67.5° and 247.5°, runs through an amplitude zero value, and at 157.5° as well as 337.5°, through an amplitude maximum value.

Correspondingly, this is also valid for the superimposition of movement vectors in accord with FIGS. 9A and 9C, whereby merely a displacement of the linear relative movement with regard to the shown time points results, which displacement depends on the phase position. In this case, the amplitude zero value is found at 112.5° and 292.5° and the amplitude maximum value is found at 22.5° as well as 202.5°.

Figure 10A:
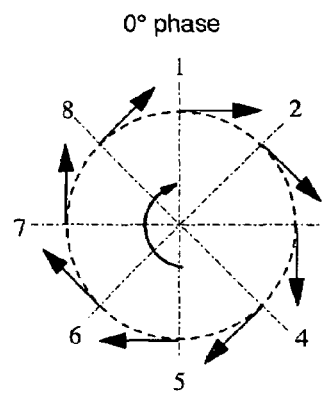
FIG. 10A to FIG. 10C a top view onto vibration heads, situated opposing one another, at a start phase difference of 90° or 270°, respectively, and with a counter running direction of rotation.
Figure 10B:
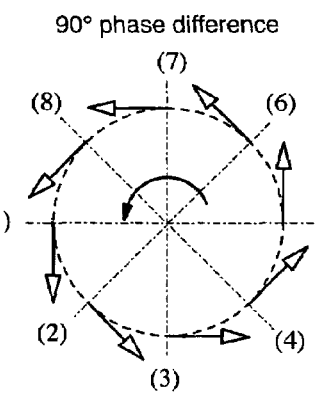
Figure 10C:
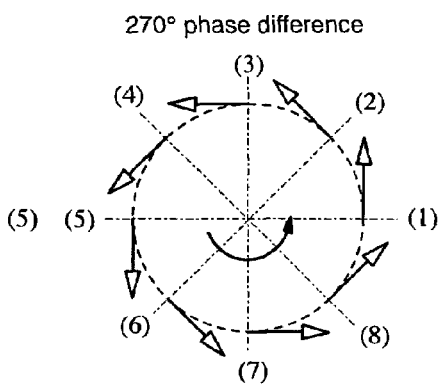
Figure 10D:
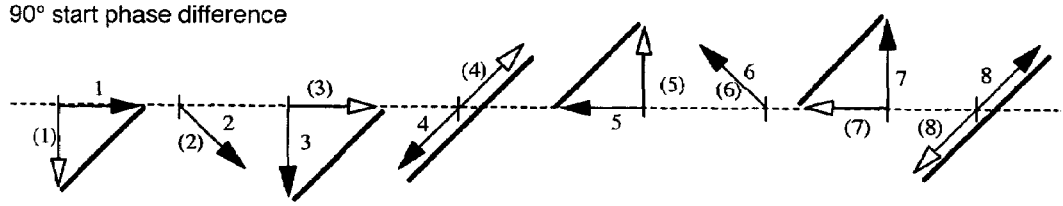
FIG. 10D and FIG. 10E a presentation of the linear relative movement for a phase difference of 90° in accord with FIG. 10B and a phase difference of 270° in accord with FIG. 10C.
Figure 10E:
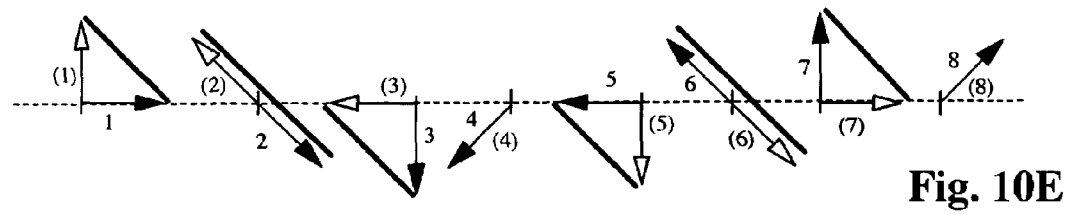

Also, where the presentation in regard to FIG. 10A to FIG. 10C is concerned, corresponding results occur for counter running rotational direction at a starting phase difference of 90° and 270°, respectively. For the 90° starting phase difference in accord with FIG. 10A and FIG. 10B, there results a linear relative movement in accord with FIG. 10D, whereby, likewise, the amplitude of the relative movement for the individual time points changes and, at the points of time 2 and 6, no relative movement occurs.

At a starting phase difference of 270° and a superimposition of the movement vectors in accord with FIG. 10A and FIG. 10C, there results the same relative movement with changing amplitude, whereby, at the time points 4 and 8, no relative movement occurs.

Figure 11A:
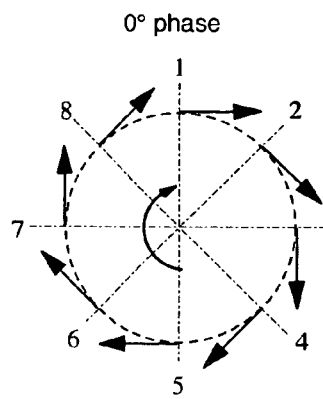
FIG. 11A to FIG. 11C a top view onto vibration heads, situated opposing one another, at a start phase difference of 135° or 225°, respectively, and with a counter running direction of rotation.
Figure 11B:
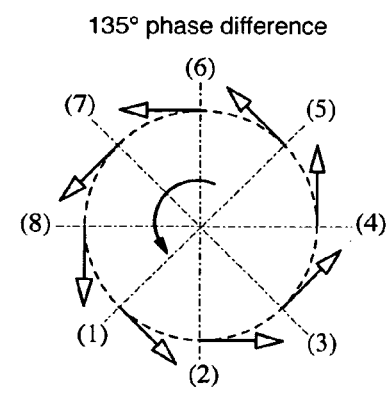
Figure 11C:
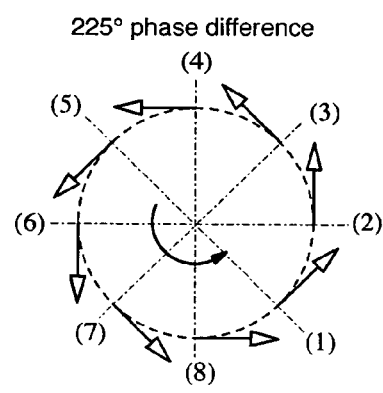
Figure 11D:
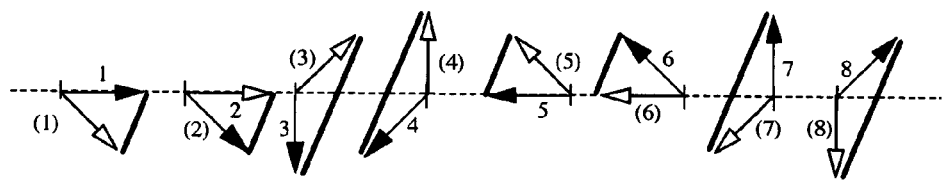
FIG. 11D and FIG. 11E a presentation of the linear relative movement for a phase difference of 135° in accord with FIG. 11B and a phase difference of 225° in accord with FIG. 11C.
Figure 11E:
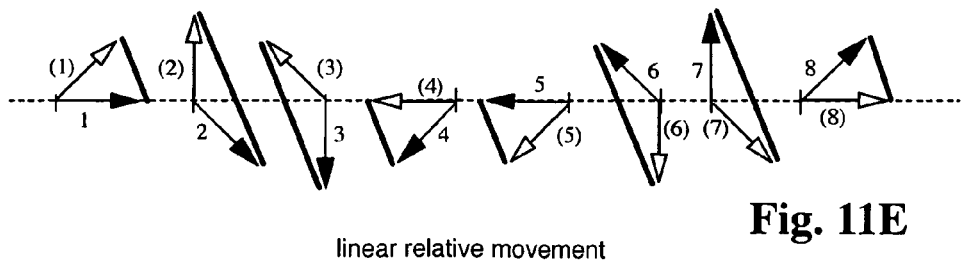

For a counter running rotational direction and at a starting phase difference of 135° or 225°, respectively, there results a situation as shown in FIG. 11D for the superimposition in accord with FIGS. 11A and 11B and at a start phase difference of 135°. Likewise, one recognizes a linear relative movement, the amplitude of which grows larger and smaller in accord with the individual observed points of time. The same is true also for the superimposition of the movement vectors in accord with FIGS. 11A and 11C, which, at the starting phase difference of 225°, leads to a linear relative movement in accord with FIG. 11E having a changing amplitude. In this case, there results for a phase difference of 135° at the start of the vibration the amplitude zero value at 22.5° and 202.5° and the amplitude maximum value at 112.5° and 292.5°. The same holds true for a phase difference of 225° at the start of the vibration with an amplitude zero value at 157.5° and 337.5° and an amplitude maximum value at 67.5° and 247.5°.

Figure 12A:
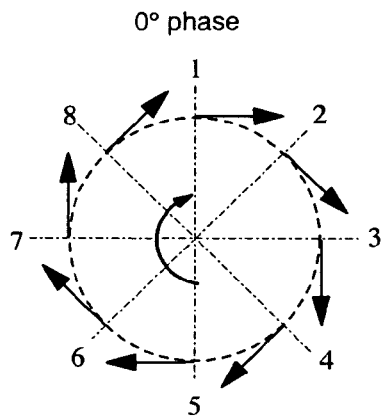
FIG. 12A and FIG. 12B a top view onto vibration heads, situated opposing one another, at a start phase difference of 180° and with a counter running direction of rotation.
Figure 12B:
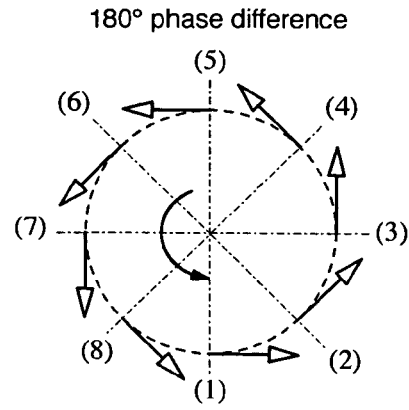
Figure 12C:
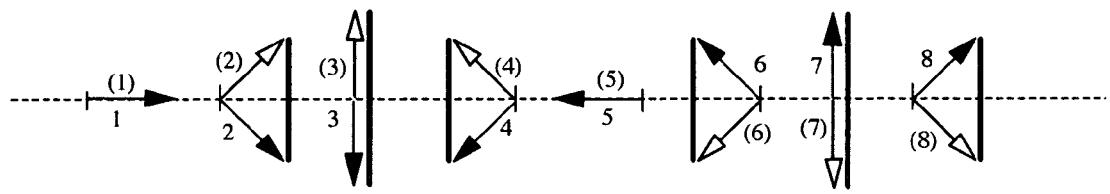
FIG. 12C a presentation of the linear relative movement for a phase difference of 180° in accord with FIG. 12B.

Finally, the conditions for a counter running rotation direction and at a starting phase difference of 180° are shown, in which the movement vectors in accord with FIG. 12A and FIG. 12B are superimposed with one another. This superimposition at the 180° phase difference leads to a linear relative movement in accord with FIG. 12C, whereby, for the time points 1 and 5, no relative movement occurs.

Figure 13:
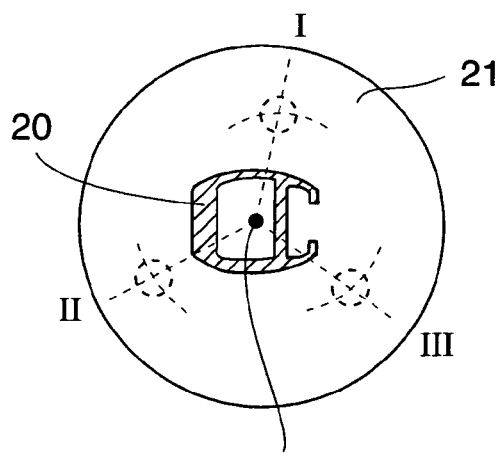
FIG. 13 a schematic presentation of an arrangement of three friction welding heads/thrust axes in an orbital plane with reference to the surface centroid in the joining plane for a structural bar.

FIG. 13 is a schematic view of an orbital disk 21 attached to a structural bar, on which disk three friction welding heads I, II and III are placed. In the given presentation is shown, in addition, the surface centroid 22, which, by means of dashed connection lines, is connected with the said friction welding heads. In order to assure that in every point of the welding seam an equal amount of energy is introduced, the friction welding heads are placed in a position on the orbital disk, wherein, upon an equal input of energy, the mathematical product of the distance multiplied by the axial pressing force effective in the respective friction welding head is constant. Thereby, an equalized energy input into the joining plane and thus a uniformly running welding seam is assured.

It is also possible that the friction welding heads, because of space considerations, must be placed on one side of the orbital disk as regards their mass centroid. If this is the case, care must be taken in regard of a compensation of weight with the aid of balancing methods. It is necessary that the virtual combined friction axis runs through the mass centroid of all movable components.

Figure 14:
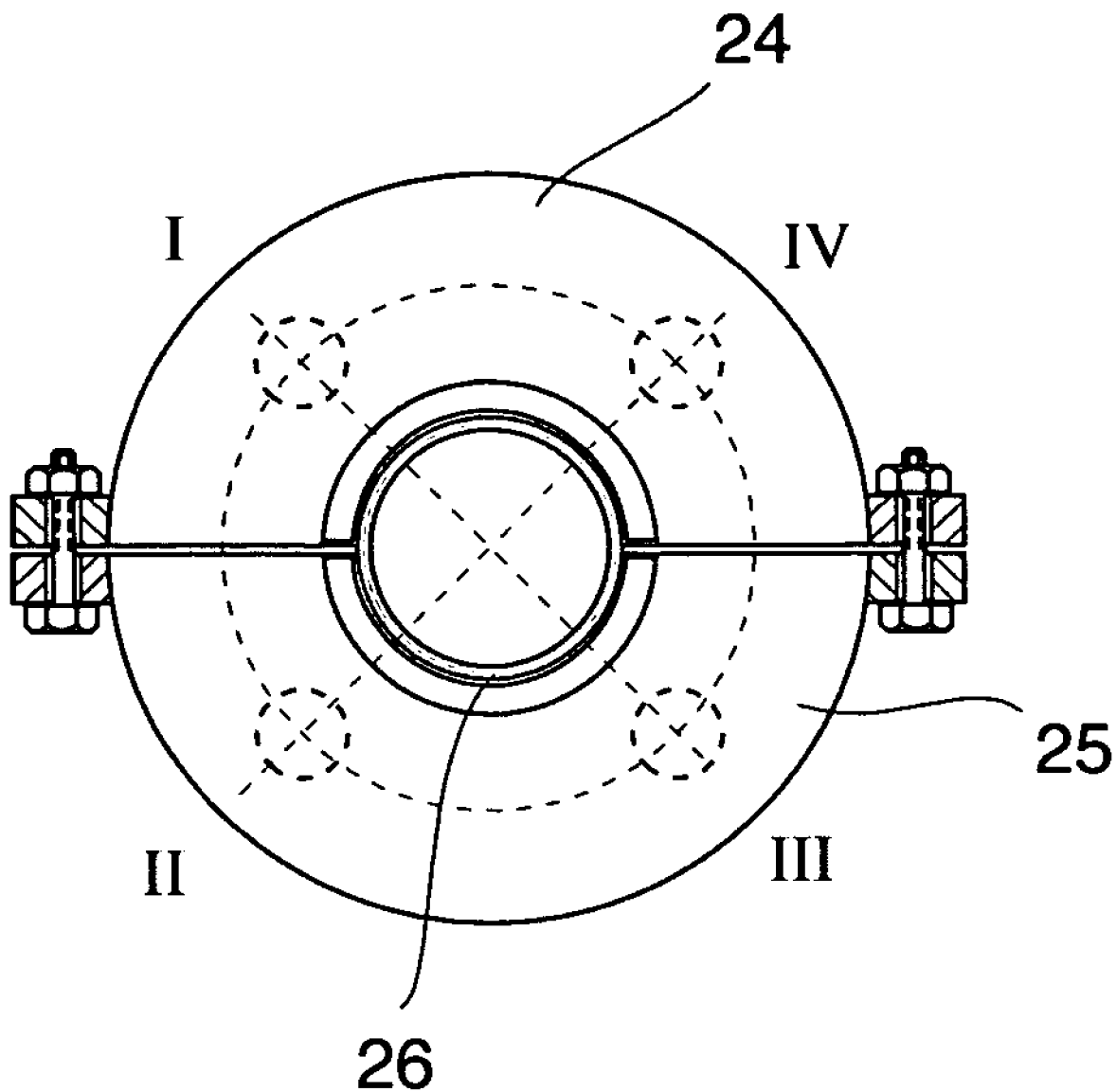
FIG. 14 a schematic presentation of the arrangement of the friction welding heads on a disk, which disk encircles the pipe section to be welded, and which is fastened with set screws to the pipe section to be welded.

In order to be able to assure a stationary fixation at the workpiece to be welded, the most different methods are provided. In the case of the application of the welding of pipe sections, a simple solution to the problem is shown in FIG. 14, wherein, a divided orbital disk, which is separated into in two halves 24 and 25 is shown, and which halves, for the welding of a pipe shaped workpiece, lie about the circumference of the tube and are tightly clamped thereto.

Such a divided orbital disk, with reassembly capabilities and having the friction welding heads I, II, III, and IV can, for example, be mounted on a vehicle, which travels along the pipeline for the purpose of welding long pipelines, such as are used for conducting gas, oil or water and which are laid out one piece after the other, and grips the pipe sections to be mutually welded at each welding station by clamping them between the orbital disks and introducing into the joining plane the axially directed pressure necessary for the welding.

The friction welding of such pipes is carried out with the aid of the invention in very short intervals of time, whereby it may be assumed that, for the actual welding procedure, less than a few minutes is required, with the respective energy introduction. If, for the purpose of comparison, the welding of pipelines with conventional welding methods is regarded, then the result demonstrates a very large economical advantage, since the production of a welding seam of high quality by conventional means for pipes to be placed under high loadings, requires time periods running to more than 10 to 100 times the above period.

Instead of a transportable orbital friction welding device in accord with the invention, it is possible that the welding equipment can be of a stationary type, in order that a plurality of pipe sections to be welded can be slidingly moved, one after the other, through the said welding equipment for the welding operation.

An application, which is not further described, is the welding of workpieces, which stand vertically on one another in a T-shape, such as, for example, T-shaped pipe branching or a structural support bar on a transverse beam.

For this purpose, the vibration heads of the more than one friction welding heads are stationary affixed to the transverse beam in an axial plane, which stands perpendicularly to the longitudinal axis of the said support bar, and on the other side of the joining plane, that is, in an orbital plane about the support bar a further plurality (n) of friction welding heads are affixed. The vibration heads of the friction welding heads are then, on both side of the joining plane, set in vibration with the same friction frequency, whereby between the friction welding heads placed on the one side of the joining plane and those placed on the other side of the joining plane a predetermined phase difference can be maintained. To this end, a linear vibration by means of a counter running rotation direction can be used, or possibly, a circular vibration by means of an equal running rotation direction.

What is claimed:

1. An orbital friction welding method for the welding of workpieces, wherein the workpieces, during the introduction of the vibratory energy, are pressed together at a joining plane, characterized in that at least one side of the joining plane, more than one (n>1) friction welding heads are so mounted to at least one friction disk in an orbital plane in the area of the workpiece that vibration heads of the friction welding heads are stationarily attached to the friction disk, and the more than one (n>1) friction welding heads, which are proximal to one side, respectively, are set into vibration at the same friction frequency and the same amplitude as well as with an equal, predetermined phase position.

2. An orbital friction welding method accord with claim 1, characterized in that the thrust or joining pressure, respectively, of the more than one (n>1) friction welding heads required for an energy input is generated using more than one (n>1) thrust axes in such a manner that the virtual combined axis formed by superimposition, runs through the area of a joining plane centroid.

3. An orbital friction welding method accord with claim 1, characterized in that the more than one (n>1) friction welding heads are so arranged that the friction axes in total with their virtual combined friction axis run through the area of a centroid of all vibrating masses.

4. An orbital friction welding method accord with claim 1, characterized in that
the vibration heads of the more than one (n>1) friction welding heads are placed stationarily on both sides of the joining plane in a plurality of orbital planes, respectively, and
the more than one (n>1) friction welding heads on the one side of the joining plane are set into vibration with a predetermined phase position with reference o the more than one (n>1) friction welding heads on the other side of the joining plane.

5. An orbital friction welding method in accord with claim 1,
characterized in that
the pressure, with which the workpieces in the joining plane are pressed together, is generated by thrust mechanisms, which conduct the workpieces together in the axial direction under a time/distance control, whereby the virtual combined axes need not run through a centroid of the workpieces.

6. An orbital friction welding device for the carrying out of the method in accord with claim 1, whereby a circular movement energy can be introduced into the joining plane for the welding of workpieces having arbitrary cross-sections in the joining plane, which workpieces are subjected to an axial pressure,
characterized in that
the vibration heads of the more than one (n>1) friction welding heads are so placed stationarily in at least one orbital plane about the workpieces to be welded and on at least one friction disk that the virtual combined orbital axis, which are formed by the superimposition of the more than one (n>1) friction axes of the individual friction welding heads, run through the area of a mass centroid, and
the more than one (n>1) friction welding heads vibrate with the same friction frequency, the same amplitude, and a predetermined phase position.

7. An orbital friction welding device in accord with claim 6, characterized in that,
when using force control, all thrust axes possess, for the creation of surface symmetry in regard to a joining surface centroid, the same distance from the joining surface centroid in the joining plane and, simultaneously, are angularly symmetrical arranged, and
the mathematical product of the distance of the individual thrust axes from the joining surface centroid multiplied with the respective axial pressing force is constant at the combined orbital axis for all friction welding heads.

8. An orbital friction welding device in accord with claim 6, characterized in that
all thrust axes have different distances from the joining surface centroid,
the thrust force of the respective thrust axes, when considering the angular positioning of the thrust axes to one another, is inversely proportional to its distance from the joining surface centroid, and
the mathematical product of the distance of the individual thrust axes from the joining surface centroid multiplied with the respective axial pressing force is constant at the combined orbital axis for all friction welding heads.

9. An orbital friction welding device in accord with claim 6, characterized in that
on both sides of the joining plane, respectively, a plurality of friction welding heads are stationarily affixed to a friction disk located in the orbital plane around the workpieces to be welded, and
all friction welding heads located on the same friction disk vibrated with the same frequency, the same amplitude and the same phase position.

10. An orbital friction welding device in accord with claim 6,
characterized in that
one of the workpieces to be welded end to end is stationarily affixed, and
the more than one (n>1) friction welding heads affixed about the second workpiece set this into vibration.

11. An orbital friction welding device in accord with claim 6,
characterized in that
the more than one (n>1) friction welding heads are circularly affixed on both sides of the joining plane of the workpieces, which are to be welded on an end face, whereby the more than one (n>1) friction welding heads on both sides of the joining plane oppose each other with a vibration having one of equal running phase or a counter running rotation with a continuously changing phase difference, and having a predetermined starting phase.

12. An orbital friction welding device in accord with claim 6,
characterized in that
the more than one friction welding heads, which are affixed on one side of the joining plane, vibrate with one of a counter running phase or an equal running direction of rotation, and with a predetermined phase difference with reference to the more than one friction welding heads, which are placed on the other side of the joining plane.

13. An orbital friction welding device in accord with claim 11 or claim 12,
characterized in that
the more than one friction welding heads, which are affixed on one side of the joining plane vibrate with phase difference between 0° and 360° with reference to the more than one friction welding heads, which are placed on the other side of the joining plane.

14. An orbital friction welding device in accord with claim 6,
characterized in that
the more than one (n>1) friction welding heads are one of stationarily mounted about pipes or members such that they are positionable with a vehicle, or
the pipes or members can be moved through a plurality of stationary orbitally arranged friction welding heads into the respective welding position and be fixed in that position.

15. An orbital friction welding device in accord with claim 6,
characterized in that
the friction disks, which are provided with the more than one (n>1) friction welding heads and bound to the workpiece, for the generation of the pressure to be applied during the introduction of the vibration energy into the joining plane, can be moved against one another under distance/time control with the aid of thrust units, whereby the virtual combined axis runs through the surface centroid of the workpieces.

16. An orbital friction welding device in accord with claim 15,
characterized in that the thrust units are engage with the friction disks, which are arranged on both sides of the joining plane affixed to the workpieces.

17. An orbital friction welding device in accord with claim 15, characterized in that the thrust units comprise drives selected from the group consisting of hydraulic, pneumatic, mechanical, and electromechanical drives.

18. An orbital friction welding device in accord with claim 6, with more than one (n>1) friction welding heads for the welding of workpieces with an optional cross-section in the joining plane, whereby circular movement energy provided by the friction welding heads can be introduced perpendicularly into the joining plane, the workpieces being subjected to axial pressure, characterized in that said workpieces stand angularly or in a T-shape upon one another, and consist of a pipe branch leading away from one of a longitudinal pipe or a structural bar extending from a transverse beam, a plurality of friction welding heads are stationarily mounted to the longitudinal pipe or the transverse beam in a longitudinal axis plane, which extends perpendicular to the longitudinal axis of the of the pipe branch or the structural bar, more than one (n>1) friction welding heads are affixed in an orbital plane around the pipe branch or the structural bar, the virtual combined orbital friction axis, which is formed by the superimposition of the vibrations of the plurality (n) of frictional axes of the individual friction welding heads, runs through the area of the mass centroid, and the friction welding heads on both sides of the joining plane vibrate with the same friction frequency, whereby the friction welding heads on the one side of the joining plane vibrate with counter running phase and a predetermined phase difference relative to those friction welding heads placed on the other side of the said joining plane, whereby a linear relative movement between the workpieces results in the joining plane.

19. An orbital friction welding device in accord with claim 6, characterized in that the device is used in welding applications of workpieces having a substantially greater length than their effective cross-sectional width (L>>D).

20. An orbital friction welding device in accord with claim 6, characterized in that the device is used in welding applications of workpieces having a substantially greater effective cross-sectional width than their length (D>>L).

21. An orbital friction welding device in accord with claim 6, characterized in that the device is used in welding applications of workpieces made of composite materials, wherein the thrust is distance/time controlled.

\* \* \* \* \*

UNITED STATES PATENT AND TRADEMARK OFFICE
CERTIFICATE OF CORRECTION

PATENT NO.       : 7,441,689 B2  Page 1 of 1
APPLICATION NO. : 11/339249
DATED            : October 28, 2008
INVENTOR(S)      : Leonhard Crasser It is certified that error appears in the above-identified patent and that said Letters Patent is hereby corrected as shown below:

Col. 10 line 66 claim 3 insert --in-- between "method" and "accord"

Col. 11 line 5 claim 4 insert --in-- between "method" and "accord"

Signed and Sealed this

Tenth Day of February, 2009

JOHN DOLL
*Acting Director of the United States Patent and Trademark Office*